(12) United States Patent
Jang

(10) Patent No.: US 12,269,352 B2
(45) Date of Patent: Apr. 8, 2025

(54) ELECTRIFIED VEHICLE

(71) Applicants: Hyundai Motor Company, Seoul (KR); Kia Corporation, Seoul (KR)

(72) Inventor: Young Jin Jang, Whasung-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 68 days.

(21) Appl. No.: 18/099,453

(22) Filed: Jan. 20, 2023

(65) Prior Publication Data

US 2024/0246427 A1  Jul. 25, 2024

(30) Foreign Application Priority Data

Sep. 14, 2022  (KR) .................... 10-2022-0115698

(51) Int. Cl.
| | |
|---|---|
| *B60L 50/51* | (2019.01) |
| *B60L 53/24* | (2019.01) |
| *B60L 55/00* | (2019.01) |
| *H02M 1/42* | (2007.01) |

(52) U.S. Cl.
CPC .............. *B60L 50/51* (2019.02); *B60L 53/24* (2019.02); *B60L 55/00* (2019.02); *B60L 2210/10* (2013.01); *B60L 2210/30* (2013.01); *B60L 2210/40* (2013.01); *B60L 2240/463* (2013.01); *H02M 1/4208* (2013.01)

(58) Field of Classification Search
CPC .......... B60L 50/51; B60L 53/24; B60L 55/00; B60L 2210/10; B60L 2210/30; B60L 2210/40; B60L 2240/463; H02M 1/4208

USPC .......................................... 307/9.1
See application file for complete search history.

(56) References Cited

U.S. PATENT DOCUMENTS

| | | | | |
|---|---|---|---|---|
| 2015/0381098 | A1* | 12/2015 | Hsu .................... | H02P 25/092 |
| | | | | 318/701 |
| 2021/0207697 | A1* | 7/2021 | Ahn .................... | B60K 1/00 |
| 2022/0355686 | A1* | 11/2022 | Teng .................... | H02J 7/02 |
| 2022/0360184 | A1* | 11/2022 | Teng .................... | H02J 7/02 |
| 2023/0387909 | A1* | 11/2023 | Waltrich ............... | H02P 27/08 |

\* cited by examiner

*Primary Examiner* — Rexford N Barnie
*Assistant Examiner* — Swarna N Chowdhuri
(74) *Attorney, Agent, or Firm* — Morgan, Lewis & Bockius LLP

(57) ABSTRACT

An electrified vehicle includes a motor including windings, a power factor correction circuit including AC and DC terminals and including legs corresponding to respective AC terminals and connected between the DC terminals, and a DC/DC converter including a first switching circuit including first, second, and third primary legs connected between terminals of a battery, a second switching circuit including at least one secondary leg connected between the DC terminals, and a transformer connected between the first and second switching circuits. In a battery discharging mode, the DC/DC converter switches the first primary leg and the at least one secondary leg, outputting a voltage of the battery to the DC terminals via the transformer. When the motor may be driven, the DC/DC converter switches the second and third primary legs electrically disconnected from the transformer, outputting the voltage of the battery to the motor.

13 Claims, 6 Drawing Sheets

ELECTRIFIED VEHICLE

CROSS-REFERENCE TO RELATED APPLICATION

The present application claims priority to Korean Patent Application No. 10-2022-0115698, filed on Sep. 14, 2022, the entire contents of which is incorporated herein for all purposes by this reference.

BACKGROUND

1. Field of the Present Disclosure

The present disclosure relates to relates to an electrified vehicle configured to drive a torque vectoring control motor through a bidirectional charger.

2. Description of Related Art

Recently, in accordance with a global tendency toward a reduction in carbon dioxide emissions, demand for an electrified vehicle configured to generate driving power by driving a motor using electrical energy stored in an energy storage device such as a battery, in place of a typical internal combustion engine vehicle configured to generate driving power through combustion of fossil fuels, has greatly increased.

Such an electrified vehicle may include an on-board charger (OBC) configured to recharge a battery using system power. Generally, such an on-board charger is constituted by a power factor correction circuit (PFC) configured to convert an external AC voltage into a DC voltage, and a DC/DC converter configured to adjust the converted DC voltage into a voltage required for a battery.

Recently, in accordance with an increase in the capacity of a battery provided in an electrified vehicle, vehicle-to-grid (V2G) and vehicle-to-load (V2L) technologies for supplying energy stored in a battery to a system and an electrical load via an on-board charger have been developed.

Meanwhile, the electrified vehicle may include a torque vectoring control motor configured to independently control a torque transmitted to left and right wheels to reduce understeer and oversteer occurring during turning of the vehicle, as well as a driving motor configured to generate driving power.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to reducing the number and area of elements used for driving of a torque vectoring control motor by driving the torque vectoring control motor through a DC/DC converter included in a bidirectional charger.

It is another object of the present disclosure to simultaneously support a torque vectoring control operation and a battery discharging mode while driving of an electrified vehicle by controlling a three-phase DC/DC converter included in a bidirectional charger to be separated into a single-phase DC/DC converter and a single-phase inverter while driving of the electrified vehicle.

It will be appreciated by persons skilled in the art to which an exemplary embodiment of the present disclosure pertains that technical problems to be solved as an exemplary embodiment of the present disclosure are not limited to the above-described technical problems, and other technical problems will be more clearly understood from the following description.

In accordance with an aspect of the present disclosure, the above and other objects may be accomplished by the provision of an electrified vehicle including a battery, a motor including a plurality of windings, a power factor correction circuit having AC terminals and DC terminals, the power factor correction circuit including a plurality of legs respectively corresponding to the AC terminals while being connected between the DC terminals, and a DC/DC converter including a first switching circuit including first, second, and third primary legs connected between first and second terminals of the battery, a second switching circuit including at least one secondary leg connected between the DC terminals, and a transformer connected between the first switching circuit and the second switching circuit, wherein, when a battery discharging mode is performed, the DC/DC converter switches the first primary leg and the at least one secondary leg, outputting a voltage of the battery to the DC terminals via the transformer, and wherein, when the motor is to be driven, the DC/DC converter switches the second and third primary legs electrically disconnected from the transformer, outputting the voltage of the battery to the motor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
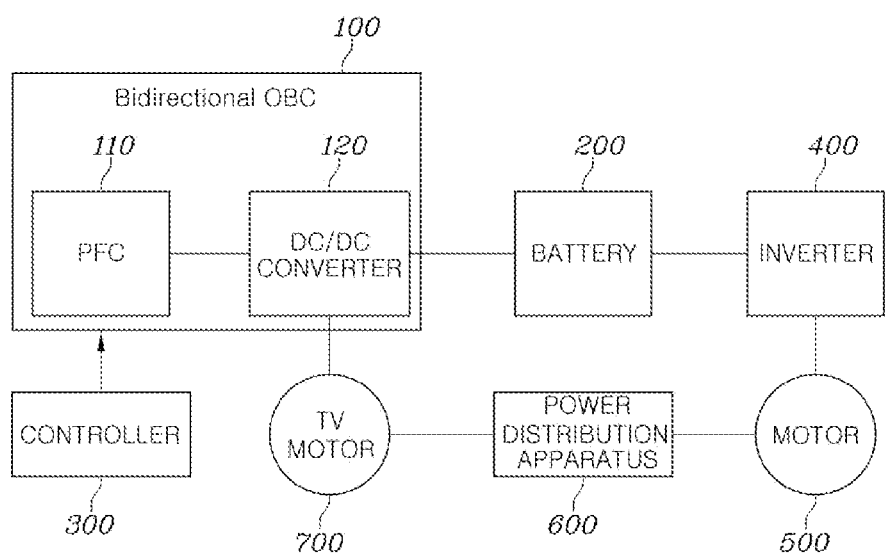
FIG. 1 is a block diagram showing a configuration of an electrified vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings, and the same or similar elements are designated by the same reference numerals regardless of the numerals in the drawings and redundant description thereof will be omitted.

In the following description of the exemplary embodiments of the present disclosure, a detailed description of known functions and configurations incorporated herein will be omitted when it may obscure the subject matter of the exemplary embodiments of the present disclosure. Furthermore, the exemplary embodiments of the present disclosure will be more clearly understood from the accompanying drawings and should not be limited by the accompanying drawings, and it is to be appreciated that all changes, equivalents, and substitutes that do not depart from the spirit and technical scope of the present disclosure are encompassed in an exemplary embodiment of the present disclosure In the following description of embodiments, the term "predetermined" means that, when a parameter is used in a process or an algorithm, the numerical value of the parameter has been previously determined. The numerical value of the parameter may be set when the process or the algorithm is begun or during a period in which the process or algorithm is executed in accordance with an exemplary embodiment of the present disclosure.

The suffixes "module" and "unit" of elements herein are used for convenience of description and thus may be used interchangeably and do not have any distinguishable meanings or functions.

It will be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

In the present specification, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

The controller may include a communication device configured to communicate with another controller or a sensor, for control of a function to be performed thereby, a memory configured to store an operating system, logic commands, input/output information, etc., and at least one processor configured to execute discrimination, calculation, determination, etc. required for control of the function to be performed.

FIG. 1 is a block diagram showing a configuration of an electrified vehicle according to various exemplary embodiments of the present disclosure.

The electrified vehicle may include a bidirectional charger 100, a battery 200, a controller 300, an inverter 400, a driving motor 500, a power distribution apparatus 600, and a torque vectoring control motor (TV motor) 700.

The bidirectional charger 100 may include a power factor correction circuit (PFC) 110 and a DC/DC converter 120, and may support a battery recharging mode and a battery discharging mode. The battery recharging mode may be performed in a stopped state of the vehicle, and the battery discharging mode may be performed in a driving state of the vehicle as well as in the stopped state of the vehicle. In the present exemplary embodiment of the present disclosure, the battery discharging mode may be a vehicle-to-load (V2L) mode in which electric power from the battery 200, which is mounted in the electrified vehicle, is output to an external AC load.

In more detail, when the battery recharging mode is performed, the bidirectional charger 100 may convert an external AC voltage received from a system power source into a DC voltage through the power factor correction circuit 110, and may adjust the converted DC voltage into a voltage required for the battery 200.

Furthermore, when the battery discharging mode is performed, the bidirectional charger 100 may adjust a voltage of the battery 200 through the DC/DC converter 120, and may output the adjusted voltage to the power factor correction circuit 110. The bidirectional charger 100 may convert the adjusted voltage into an AC voltage through the power factor correction circuit 110, and may then supply the converted AC voltage to the external AC load.

The controller 300 may control turn-on states, etc. of a relay and a switch element included in the bidirectional charger 100.

The inverter 400 may drive the driving motor 500 based on a voltage of the battery 200. The power distribution apparatus 600 may transmit driving force from the driving motor 500 to a one-side wheel (left wheel) and an other-side wheel (right wheel) of the electrified vehicle.

Furthermore, the power distribution apparatus 600 may perform a torque vectoring control operation for transmitting driving force of the torque vectoring control motor 700 to the wheels (the left and right wheels) at different levels, respectively, and accordingly, may reduce understeer and oversteer occurring during turning of the vehicle.

Generally, for execution of a torque vectoring control operation, a separate driver for the torque vectoring control motor 700 should be provided. In the electrified vehicle according to the present exemplary embodiment of the present disclosure, however, the torque vectoring control motor 700 is driven through the DC/DC converter 120 included in the bidirectional charger 100, and accordingly, it may be possible to reduce the number and area of elements used for driving of the torque vectoring control motor 700. A configuration for achieving the present effect is shown in FIG. 2.

Figure 2:
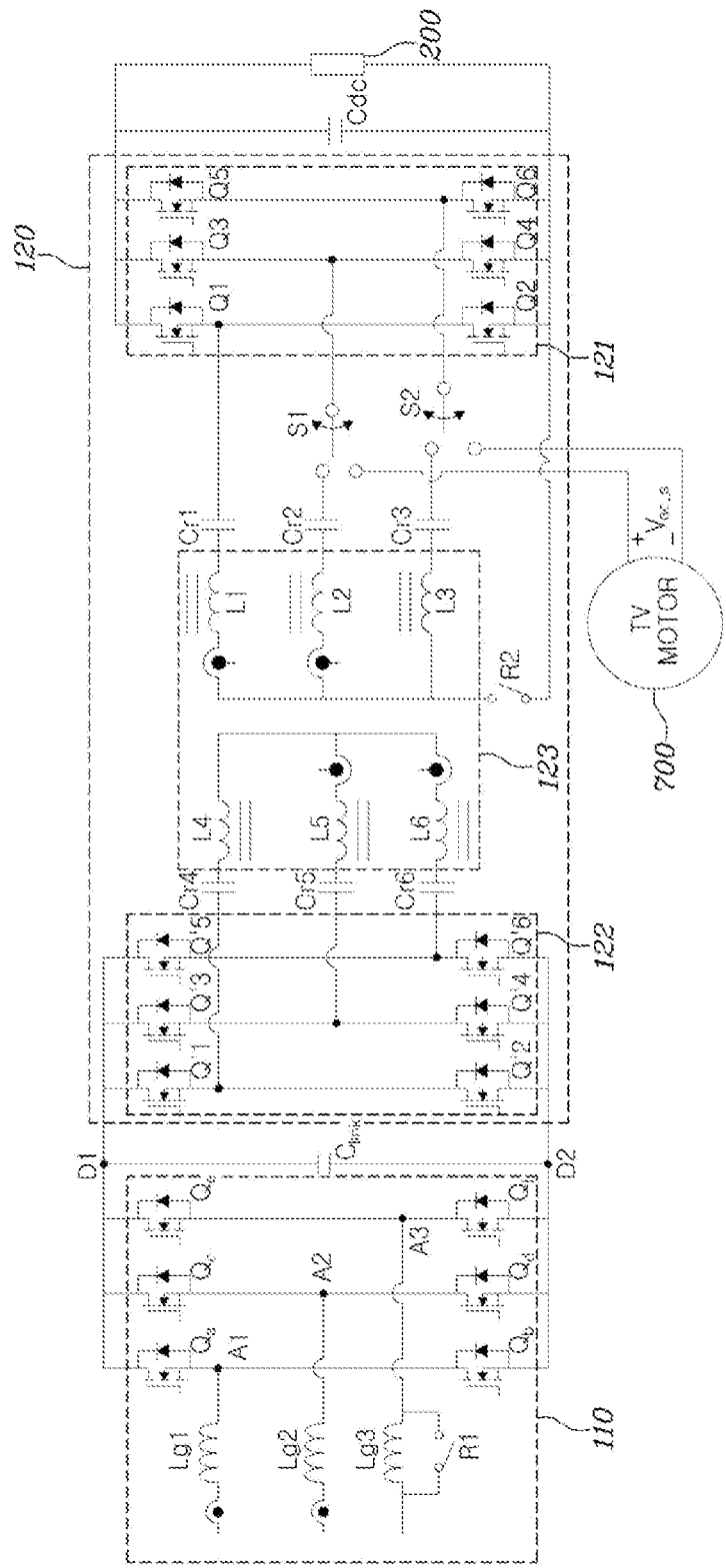
FIG. 2 is a circuit diagram of a battery charging system for an electrified vehicle according to various exemplary embodiments of the present disclosure.

FIG. 2 is a circuit diagram of a battery charging system for an electrified vehicle according to various exemplary embodiments of the present disclosure.

Referring to FIG. 2, the battery charging system may include a bidirectional charger including a power factor correction circuit 110, a DC/DC converter 120, and a link capacitor Clink, a battery 200, a DC capacitor Cdc, and a torque vectoring control motor 700 configured to be driven through the bidirectional charger. The DC capacitor Cdc may be connected between both terminals of the battery 200.

The power factor correction circuit 110 may have AC terminals A1, A2, and A3, and DC terminals D1 and D2, and may include a plurality of input inductors Lg1, Lg2, and Lg3, and a plurality of legs Qa-Qb, Qc-Qd, and Qe-Qf.

One end of each of the input inductors Lg1, Lg2, and Lg3 may be connected to a corresponding one of the AC terminals A1, A2, and A3. A system AC power source (in a battery recharging mode) or an external AC load (in a battery discharging mode) may be connected to the other end of each of the input inductors Lg1, Lg2, and Lg3. A relay R1 may be connected to the input inductor Lg3 in parallel.

The plurality of legs Qa-Qb, Qc-Qd, and Qe-Qf may correspond to the AC terminals A1, A2, and A3, respectively, and may be connected between the DC terminals D1 and D2. In the present exemplary embodiment of the present disclosure, each leg means a configuration in which a plurality of switch elements is interconnected. Each of the switch elements may be implemented as a transistor. Switching of a leg may be understood as complementary switching of a plurality of switch elements included in the leg.

In the battery recharging mode, the power factor correction circuit 110 may convert a voltage of a selected one of the AC terminals A1, A2, and A3 into a DC voltage through switching of the plurality of legs Qa-Qb, Qc-Qd, and Qe-Qf, and may output the converted DC voltage to the DC terminals D1 and D2. Furthermore, in the battery discharging mode, the power factor correction circuit 110 may convert a voltage between the DC terminals D1 and D2 into an AC voltage, and may output the converted AC voltage to the AC terminals A1, A2, and A3.

The link capacitor Clink may be connected between the DC terminals D1 and D2.

The DC/DC converter 120 may include a first switching circuit 121 connected to the battery 200, and a second switching circuit 122 connected to the DC terminals D1 and D2. The DC/DC converter 120 may also include a transformer 123 connected between the first switching circuit 121 and the second switching circuit 122 to electrically insulate the battery 200 from the system power source or the external AC load.

The first switching circuit 121 may include a first primary leg Q1-Q2, a second primary leg Q3-Q4, and a third primary leg Q5-Q6 which are connected between both terminals of the battery 200. The second switching circuit 122 may include a first secondary leg Q'1-Q'2, a second secondary leg Q'3-Q'4, and a third secondary leg Q'5-Q'6 which are connected between the DC terminals D1 and D2. The number of legs included in each of the first switching circuit 121 and the second switching circuit 122 may be variously set in accordance with embodiments.

The transformer 123 may include a plurality of primary coils L1, L2, and L3, and a plurality of secondary coils L4, L5, and L6. The plurality of primary coils L1, L2, and L3 may correspond to the plurality of secondary coils L4, L5, and L6, respectively. The transformer 123 may convert current and a voltage in accordance with turn ratios of the plurality of primary coils L1, L2, and L3 and the plurality of secondary coils L4, L5, and L6.

One-side ends of the plurality of primary coils L1, L2, and L3 are connected to the first primary leg Q1-Q2, the second primary leg Q3-Q4, and the third primary leg Q5-Q6, respectively, and other-side ends of the plurality of primary coils L1, L2, and L3 may be short-circuited together. Similarly, one-side ends of the plurality of secondary coils L4. L5, and L6 are connected to the first secondary leg Q'1-Q'2, the second secondary leg Q'3-Q'4, and the third secondary leg Q'5-Q'6, respectively, and other-side ends of the secondary coils L4, L5, and L6 may be short-circuited together.

A plurality of primary resonant capacitors Cr1, Cr2, and Cr3 is connected between the plurality of primary coils L1, L2, and L3 and the first, second, and third primary legs Q1-Q2, Q3-Q4, and Q5-Q6, respectively. A plurality of secondary resonant capacitors Cr4, Cr5, and Cr6 is connected between the plurality of secondary coils L4, L5, and L6 and the first, second, and third secondary legs Q'1-Q'2, Q'3-Q'4, and Q'5-Q'6, respectively. Accordingly, the DC/DC converter 120 may realize an LLC resonant filter based on magnetization inductance and leakage inductance of the plurality of coils L1 to L6 as well as the plurality of resonant capacitors Cr1 to Cr6.

As described above, the DC/DC converter 120 may support the battery recharging mode and the battery discharging mode by bidirectionally converting a DC voltage through the first switching circuit 121 and the second switching circuit 122 disposed at opposite sides of the transformer 123.

In accordance with the present exemplary embodiment of the present disclosure, when torque vectoring control is required during turning of the vehicle in a driving state of the vehicle, the torque vectoring control motor 700 is driven through the first switching circuit 121 included in the DC/DC converter 120, and, accordingly, the number and area of elements used for driving of the torque vectoring control motor 700 may be reduced.

Furthermore, in accordance with the present exemplary embodiment of the present disclosure, the battery discharging mode may be performed even in a driving state of the vehicle. Accordingly, driving of the torque vectoring control motor 700 and the battery discharging mode may be simultaneously performed while driving of the vehicle by controlling the DC/DC converter 120 to be separated into a single-phase DC/DC converter and a single-phase inverter in a driving state of the vehicle.

Hereinafter, the battery recharging mode, the battery discharging mode, and the torque vectoring control operation performed in the DC/DC converter 120 will be described.

When the battery recharging mode is performed, the DC/DC converter 120 may switch the first, second, and third primary legs Q1-Q2, Q3-Q4, and Q5-Q6 and the first, second, and third secondary legs Q'1-Q'2, Q'3-Q'4, and Q'5-Q'6, outputting a voltage between the DC terminals D1 and D2 to the battery 200 via the transformer 123. That is, the DC/DC converter 120 may operate as a three-phase DC/DC converter in the battery recharging mode.

On the other hand, when the battery discharging mode is performed, the DC/DC converter 120 may switch the first primary legs Q1-Q2 from among the first, second, and third primary legs Q1-Q2, Q3-Q4, and Q5-Q6 and at least one secondary leg included in the second switching circuit 122, outputting a voltage of the battery 200 to the DC terminals D1 and D2 via the transformer 123. That is, the first primary legs Q1-Q2 and the at least one secondary leg included in the second switching circuit 122 may operate as a single-phase DC/DC converter in the battery discharging mode.

The at least one secondary leg included in the second switching circuit 122 may be set to the first secondary leg Q'1-Q'2 or the second and third secondary legs Q'3-Q'4 and Q'5-Q'6, and may be switched in synchronization with a predetermined frequency for an external AC load in the battery discharging mode.

When the battery discharging mode is performed, the DC/DC converter 120 may turn on a relay R2. The relay R2 may be connected between one terminal of the battery 200 and other-side ends of the plurality of primary coils L1, L2, and L3, and may be turned off when the battery recharging mode is performed.

Upon driving the torque vectoring control motor 700 (that is, when a torque vectoring operation should be performed), the DC/DC converter 120 may switch the second and third primary legs Q3-Q4 and Q5-Q6 from among the first, second, and third primary legs Q1-Q2, Q3-Q4, and Q5-Q6, converting the voltage of the battery 200 into a single-phase AC voltage Vac_s. The DC/DC converter 120 may then output the single-phase AC voltage Vac_s to the torque vectoring control motor 700. That is, the second and third primary legs Q3-Q4 and QS-Q6 may operate as a single-phase inverter during the torque vectoring control operation.

The DC/DC converter 120 may include first and second switches S1 and S2 configured to electrically disconnect the second and third primary legs Q3-Q4 and Q5-Q6 from the transformer 123 upon driving the torque vectoring control motor 700.

Each of the first and second switches S1 and S2 may be implemented as a single pole double throw (SPDT) switch. The first switch S1 may electrically connect the second primary leg Q3-Q4 to one of the primary coil L2 of the transformer 123 and the torque vectoring control motor 700 in accordance with whether or not the torque vectoring control motor 700 should be driven. The second switch S2 may electrically connect the third primary leg Q5-Q6 to one of the primary coil L3 of the transformer 123 and the torque vectoring control motor 700 in accordance with whether or not the torque vectoring control motor 700 should be driven.

In more detail, upon driving the torque vectoring control motor 700, the first and second switches S1 and S2 may electrically disconnect the second and third primary legs Q3-Q4 and Q5-Q6 from the transformer 123, and may electrically connect the second and third primary legs Q3-Q4 and Q5-Q6 to the torque vectoring control motor 700. On the other hand, when the battery recharging mode is performed, the first and second switches S1 and S2 may electrically connect the second and third primary legs Q3-Q4 and Q5-Q6 to the transformer 123, and may electrically disconnect the second and third primary legs Q3-Q4 and QS-Q6 from the torque vectoring control motor 700.

As described above, in the electrified vehicle according to the present exemplary embodiment of the present disclosure, the DC/DC converter 120, which operates as a three-phase DC/DC converter in the battery recharging mode, is controlled to be separated into a single-phase DC/DC converter for the battery discharging mode and a single-phase inverter for driving of the torque vectoring control motor 700. Accordingly, the electrified vehicle may simultaneously perform driving of the torque vectoring control motor 700 and the battery discharging mode while driving thereof.

Meanwhile, a motor driven based on a single-phase AC voltage is generally implemented as a single-phase motor. However, such a single-phase motor has a problem of low driving efficiency, as compared to a three-phase motor driven based on a three-phase AC voltage. Accordingly, when the torque vectoring control motor 700, which is driven based on the single-phase AC voltage Vac_s, is implemented as a three-phase motor, it may be possible to enhance driving efficiency, as compared to the single-phase motor. A configuration for achieving such an effect is shown in FIG. 3.

Figure 3:
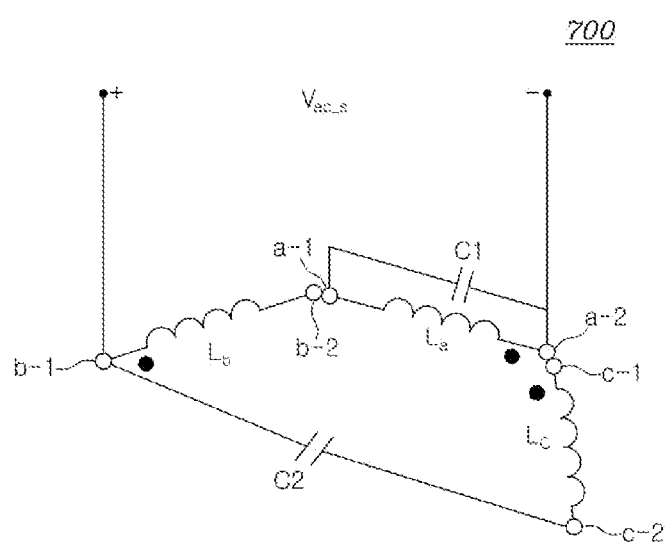
FIG. 3 is a circuit diagram of a torque vectoring control motor according to various exemplary embodiments of the present disclosure.

FIG. 3 is a circuit diagram of a torque vectoring control motor 700 according to various exemplary embodiments of the present disclosure.

As shown in FIG. 3, the torque vectoring control motor 700 is implemented as a three-phase motor including a plurality of windings La, Lb, and Le respectively corresponding to a plurality of phases, and may be driven based on a single-phase AC voltage Vac_s. Furthermore, the torque vectoring control motor 700 may include a first capacitor C1 and a second capacitor C2.

The plurality of windings La, Lb, and Le may be interconnected through delta (4) connection so that adjacent ones of one-side ends a-1, b-1, and c-1 thereof and other-side ends a-2, b-2, and c-2 thereof are interconnected through triangular connection. The single-phase AC voltage Vac_s may be applied to the other-side end a-2 of the first winding La and the one-side end b-1 of the second winding Lb.

The first capacitor C1 may be connected to the first winding La in parallel. The second capacitor C2 may be connected between the one-side end b-1 of the second winding Lb and the other-side end c-2 of the third winding Lc. The first capacitor C1 and the second capacitor C2 may be configured to achieve symmetry of coil currents, as in a three-phase motor driven based on a three-phase AC voltage, and, accordingly, the power factor of the torque vectoring control motor 700 may be enhanced.

In accordance with an exemplary embodiment of the present disclosure, the torque vectoring control motor 700 may also perform a function of a starter-generator of the vehicle, such as a mild hybrid starter-generator (MHSG) or a hybrid starter-generator (HSG).

Figure 4:
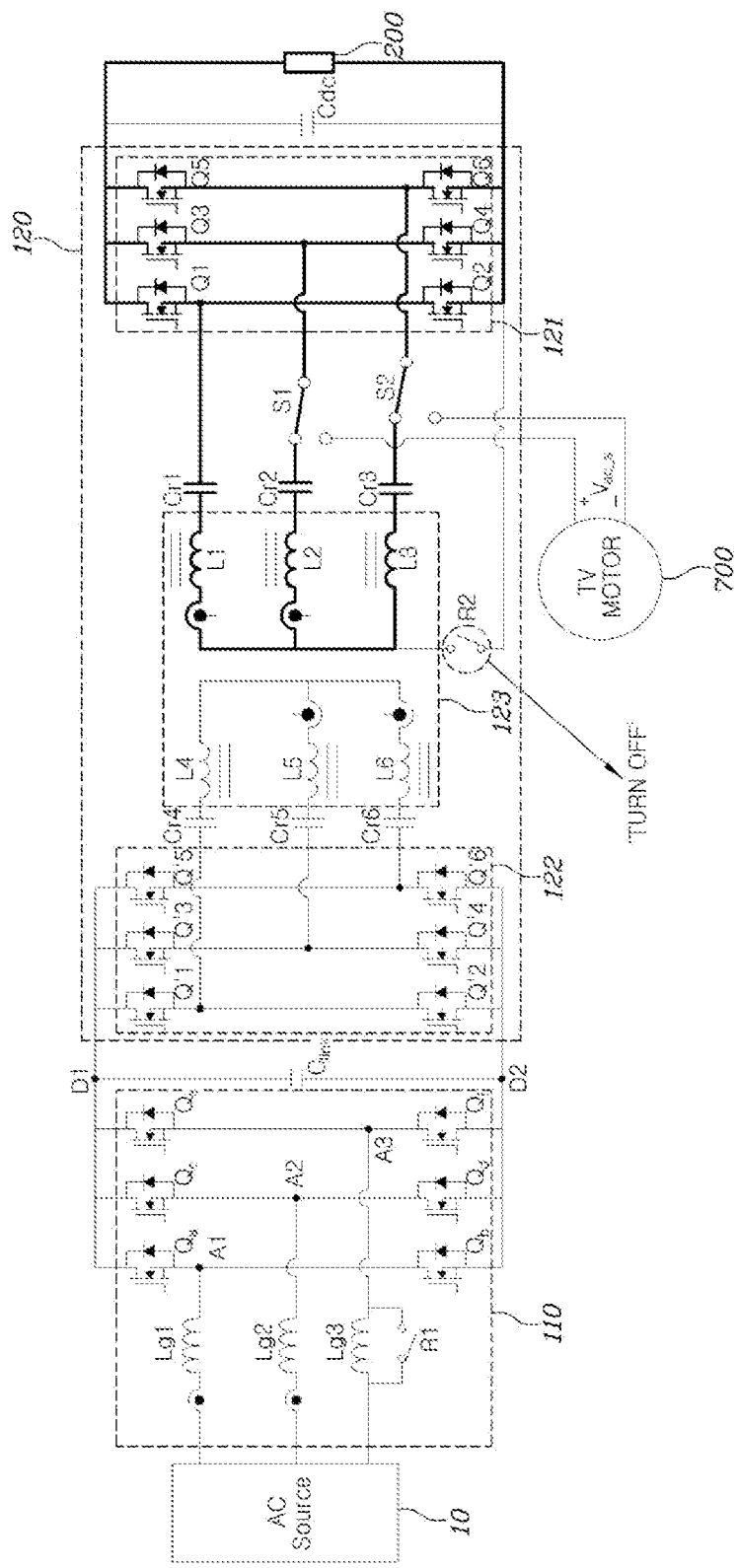
FIG. 4 is a circuit diagram explaining a battery recharging mode performed in the electrified vehicle according to the exemplary embodiment of the present disclosure.

FIG. 4 is a circuit diagram explaining the battery recharging mode performed in the electrified vehicle according to the exemplary embodiment of the present disclosure.

Referring to FIG. 4, when the battery recharging mode is performed, the power factor correction circuit 110 may receive an AC voltage from a system AC power source 10 via the input inductors Lg1, Lg2, and Lg3, may convert the received AC voltage into a DC voltage, and may then output the DC voltage to the DC terminals D1 and D2.

When the battery recharging mode is performed, the second relay R2 may be turned off, and the first and second switches S1 and S2 may electrically connect the second and third primary legs Q3-Q4 and Q5-Q6 to the transformer 123. As a result, the DC/DC converter 120 may operate as a three-phase DC/DC converter, and accordingly, may adjust a voltage between the DC terminals D1 and D2, and may output the adjusted voltage to the battery 200.

Figure 5:
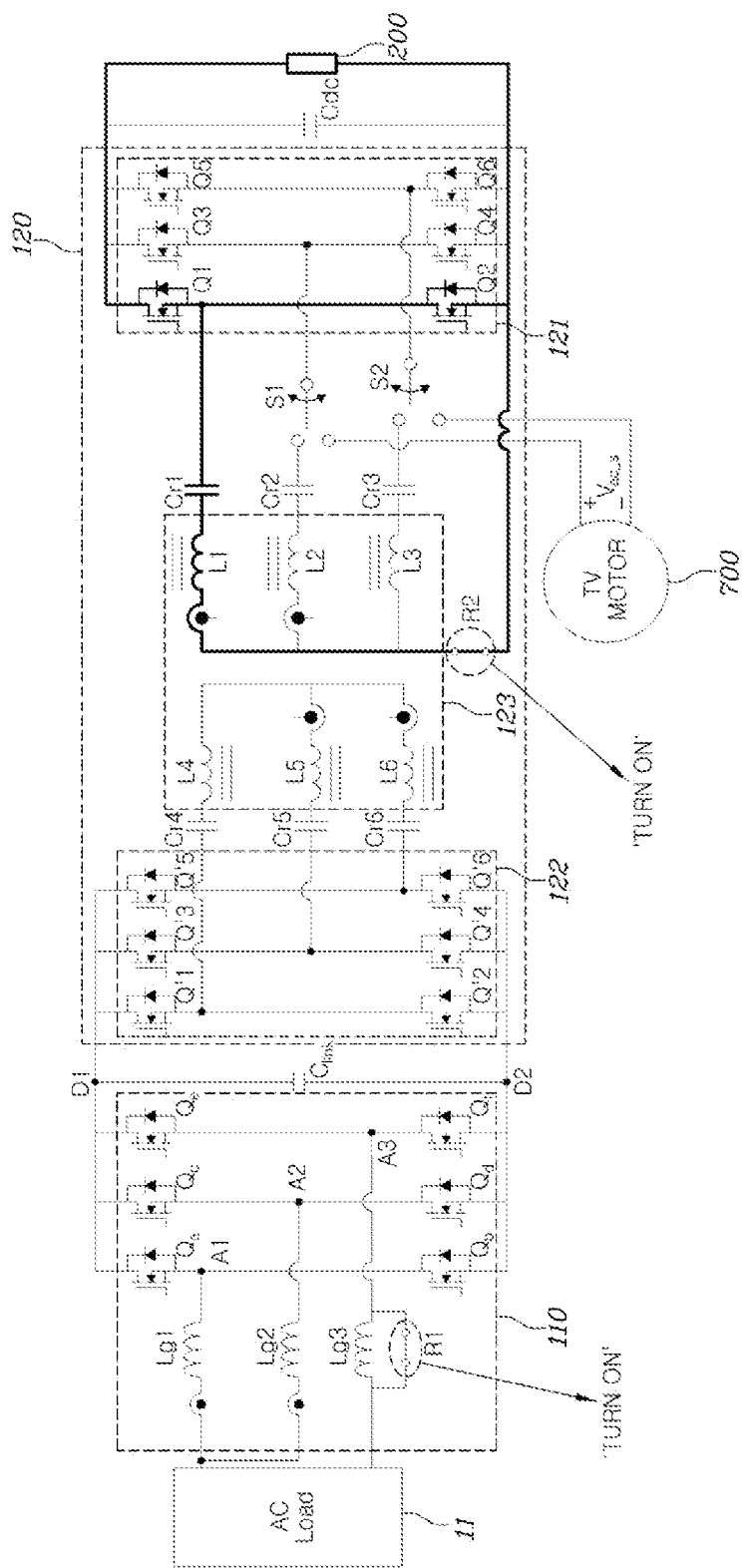
FIG. 5 is a circuit diagram explaining a battery discharging mode performed in the electrified vehicle according to the exemplary embodiment of the present disclosure.

FIG. 5 is a circuit diagram explaining the battery discharging mode performed in the electrified vehicle according to the exemplary embodiment of the present disclosure.

Referring to FIG. 5, when the battery discharging mode is performed, an external AC load 11 may be connected to the input inductors Lg1, Lg2, and Lg3 of the power factor correction circuit 110. In the instant case, the first relay R1 may be turned on.

When the battery discharging mode is performed, the second relay R2 may be turned on. Accordingly, the first primary leg Q1-Q2 and the at least one secondary leg included in the second switching circuit 122 may operate as a single-phase DC/DC converter, and accordingly, may adjust a voltage of the battery 200, and may output the adjusted voltage to the DC terminals D1 and D2. As described above, the at least one secondary leg included in the second switching circuit 122 may be switched in synchronization with a predetermined frequency for the external AC load 11.

When the battery discharging mode is performed, the power factor correction circuit 110 may convert a voltage between the DC terminals D1 and D2 into an AC voltage, and may supply the converted AC voltage to the external AC load 11.

Meanwhile, although the DC/DC converter 120 is shown as operating as a single-phase DC/DC converter in the case of FIG. 5, the DC/DC converter 120 may be controlled to operate as a three-phase DC/DC converter, as shown in FIG. 4, when the torque vectoring control operation is not performed during execution of the battery discharging mode.

Figure 6:
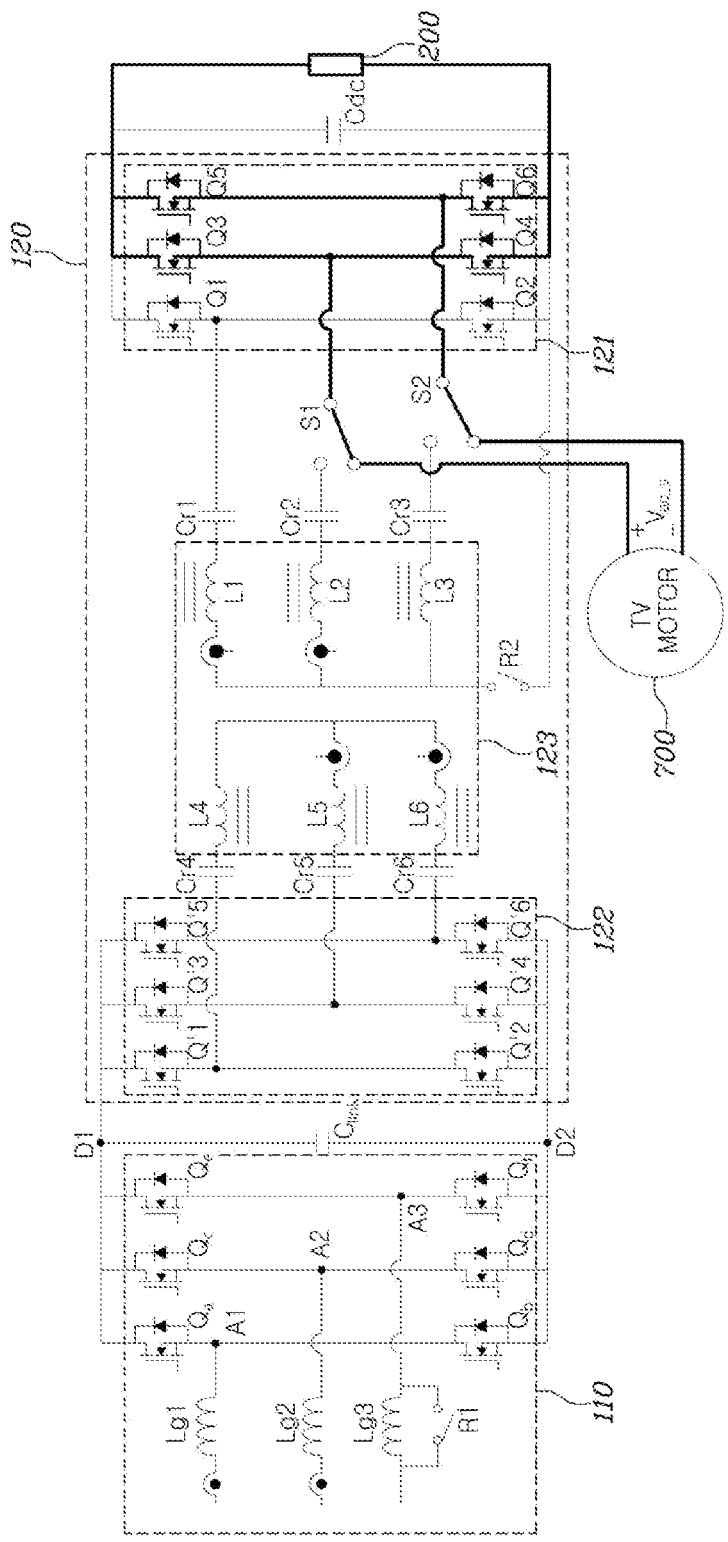
FIG. 6 is a circuit diagram showing a torque vectoring control operation performed in the electrified vehicle according to the exemplary embodiment of the present disclosure.

FIG. 6 is a circuit diagram showing the torque vectoring control operation performed in the electrified vehicle according to the exemplary embodiment of the present disclosure.

Referring to FIG. 6, when the torque vectoring control motor 700 should be driven, the first and second switches S1 and S2 may electrically connect the second and third primary leg Q3-Q4 and Q5-Q6 to the torque vectoring control motor 700. Accordingly, the second and third primary legs Q3-Q4 and Q5-Q6 may operate as a single-phase inverter, and accordingly, may convert a voltage of the battery 200 into a single-phase AC voltage Vac_s, and may output the single-phase AC voltage Vac_s to the torque vectoring control motor 700.

Furthermore, the second and third primary legs Q3-Q4 and QS-Q6 may output the voltage of the battery 200 to the torque vectoring control motor 700, irrespective of whether or not the second relay R2 is turned on. That is, differently from the case of FIG. 6, the second and third primary legs Q3-Q4 and Q5-Q6 may drive the torque vectoring control motor 700 even when the second relay R2 is in a turn-on state in accordance with execution of the battery discharging mode.

As described above, the electrified vehicle according to the exemplary embodiment of the present disclosure may simultaneously implement the battery discharging mode and the torque vectoring control operation while driving thereof by separating the first switching circuit 121 into the first primary leg Q1-Q2 for the battery discharging mode and the second and third primary legs Q3-Q4 and Q5-Q6 for driving of the torque vectoring control motor 700. In the instant case, discharge power for the external AC load 11 and driving power for the torque vectoring control motor 700 may be distributed from the charged battery power in a ratio of 1:2.

Meanwhile, the present disclosure as described above may be embodied as computer-readable code, which may be written on a program-storing recording medium. The recording medium which may be read by a computer includes all kinds of recording media, on which data which may be read by a computer system is written. Examples of recording media which may be read by a computer may include a Hard Disk Drive (HDD), a solid state drive (SSD), a silicon disk drive (SDD), a read only memory (ROM), a random access memory (RAM), a CD-ROM, a magnetic tape, a floppy disk, an optical data storage, etc. Accordingly, the above detailed description is not intended to limit the present disclosure, and it should be understood that the present disclosure is determined in accordance with reasonable interpretation of the appended claims, and all changes within an equivalent scope of the present disclosure fall within the scope of the present disclosure.

In accordance with the exemplary embodiment of the present disclosure, it may be possible to reduce the number and area of elements used for driving of the torque vectoring control motor by driving the torque vectoring control motor through the DC/DC converter included in the bidirectional charger.

In accordance with the exemplary embodiment of the present disclosure, it may also be possible to simultaneously support a torque vectoring control operation and a battery discharging mode while driving of the electrified vehicle by controlling the three-phase DC/DC converter included in the bidirectional charger to be separated into a single-phase DC/DC converter and a single-phase inverter while driving of the electrified vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electrified vehicle comprising:
   a battery;
   a motor including a plurality of windings;
   a power factor correction circuit including AC terminals and DC terminals, the power factor correction circuit including a plurality of legs respectively corresponding to the AC terminals while being connected between the DC terminals; and
   a DC/DC converter including a first switching circuit including first, second, and third primary legs connected between first and second terminals of the battery, a second switching circuit including at least one secondary leg connected between the DC terminals, and a transformer connected between the first switching circuit and the second switching circuit,
   wherein, when a battery discharging mode is performed, the DC/DC converter switches the first primary leg and the at least one secondary leg, and outputs a voltage of the battery to the DC terminals via the transformer,
   wherein, when the motor is to be driven, the DC/DC converter switches the second and third primary legs electrically disconnected from the transformer, and outputs the voltage of the battery to the motor,
   wherein the first switching circuit is connected between the battery and the transformer and the second switching circuit is connected between the DC terminals, and
   wherein the DC/DC converter further includes:
      a first switch configured to electrically connect the second primary leg to one of the motor and the transformer in accordance with whether the motor is to be driven; and
      a second switch configured to electrically connect the third primary leg to one of the motor and the transformer in accordance with whether the motor is to be driven, and
   wherein a first end of the first switch is connected to the second primary leg of the first switching circuit, a second end of the first switch is selectively connectable to the one of the transformer or the motor, a first end of the second switch is connected to the third primary leg of the first switching circuit, and a second end of the second switch is selectively connectable to the one of the transformer or motor.

2. The electrified vehicle of claim 1,
   wherein when a battery recharging mode is performed, the DC/DC converter switches the first, second, and third primary legs and the at least one secondary leg, and outputs a voltage between the DC terminals to the battery via the transformer; and
   wherein when the battery recharging mode is performed, the second and third primary legs are electrically connected to the transformer while being electrically disconnected from the motor.

3. The electrified vehicle of claim 1, wherein, when the motor is to be driven, the DC/DC converter is configured to convert the voltage of the battery into a single-phase AC voltage through the second and third primary legs, and to output the single-phase AC voltage to the motor.

4. The electrified vehicle of claim 3,
   wherein the plurality of windings includes first, second, and third windings respectively corresponding to a plurality of phases;
   wherein the first, second, and third windings are interconnected through delta connection so that adjacent ones of one-side ends thereof and other-side ends thereof are interconnected through triangular connection; and
   wherein the single-phase AC voltage is applied to the other-side end of the first winding and the one-side end of the second winding.

5. The electrified vehicle of claim 4, wherein the motor further includes:
   a first capacitor connected to the first winding in parallel; and
   a second capacitor connected between the second winding and the third winding.

6. The electrified vehicle of claim 1, further including:
   a power distribution apparatus configured to perform a torque vectoring operation for transmitting driving force of the motor to a first side wheel and a second side wheel of the vehicle at different levels, respectively.

7. The electrified vehicle of claim 1, wherein, when the battery discharging mode is performed, the at least one secondary leg is switched in synchronization with a predetermined frequency for a load connected to the AC terminals.

8. The electrified vehicle of claim 1,
   wherein the at least one secondary leg includes first, second, and third secondary legs, and
   wherein the transformer includes:
      a plurality of primary windings respectively including one-side ends each connected to a corresponding one of the first, second, and third primary legs, and other-side ends short-circuited together; and
      a plurality of secondary windings respectively including one-side ends each connected to a corresponding one of the first, second, and third secondary legs, and other-side ends short-circuited together.

9. The electrified vehicle of claim 8, wherein the DC/DC converter further includes:
   a plurality of primary resonant capacitors connected between the plurality of primary windings and the first, second, and third primary legs, respectively; and a plurality of secondary resonant capacitors connected between the plurality of secondary windings and the first, second, and third secondary legs, respectively.

10. The electrified vehicle of claim 8, wherein the DC/DC converter further includes a relay connected between one terminal of the battery and the other-side ends of the plurality of primary windings.

11. The electrified vehicle of claim 10, wherein the relay is turned off when a battery recharging mode is performed, and is turned on when the battery discharging mode is performed.

12. The electrified vehicle of claim 1, wherein
when a battery recharging mode is performed, the power factor correction circuit converts a voltage of one of the AC terminals into a DC voltage, and outputs the DC voltage to the DC terminals; and
when the battery discharging mode is performed, the power factor correction circuit converts a voltage between the DC terminals into an AC voltage, and outputs the AC voltage to the AC terminals.

13. The electrified vehicle of claim 1, further including:
a link capacitor connected between the DC terminals.

* * * * *